(12) United States Patent
Mramor et al.

(10) Patent No.: US 6,290,252 B1
(45) Date of Patent: Sep. 18, 2001

(54) AIR BAG MODULE

(75) Inventors: Vincent J. Mramor, Chandler; Timothy A. Swann, Mesa; Kevin M. Brown, Mesa; Roy D. Van Wynsberghe, Mesa; Bryan W. Shirk, Mesa; Eric C. Erike, Mesa, all of AZ (US)

(73) Assignee: Trw Inc., Lyndhurst, OH (US)

( * ) Notice: Subject to any disclaimer, the term of this patent is extended or adjusted under 35 U.S.C. 154(b) by 0 days.

(21) Appl. No.: 09/459,048

(22) Filed: Dec. 10, 1999

(51) Int. Cl.⁷ .................................................. B60R 21/16
(52) U.S. Cl. ..................... 280/728.2; 280/732; 280/743.1
(58) Field of Search ............................ 280/728.2, 728.3, 280/732, 731, 730.2

(56) References Cited

U.S. PATENT DOCUMENTS

| | | | |
|---|---|---|---|
| 4,842,300 | * | 6/1989 | Ziomek et al. ........................ 280/732 |
| 5,222,760 | * | 6/1993 | Rafferty .............................. 280/728.3 |
| 5,346,248 | * | 9/1994 | Rhein et al. ......................... 280/728.1 |
| 5,398,968 |   | 3/1995 | Emambakhsh et al. . |
| 5,527,063 | * | 6/1996 | Garner et al. ....................... 280/728.2 |
| 5,692,772 |   | 12/1997 | Boxey et al. . |
| 5,695,214 |   | 12/1997 | Faigle et al. . |
| 5,735,542 | * | 4/1998 | Bohn ................................. 280/728.2 |
| 6,010,146 | * | 1/2000 | Otsuka et al. ...................... 280/728.2 |
| 6,126,191 | * | 10/2000 | Pepperine et al. ................. 280/728.2 |
| 6,152,480 | * | 11/2000 | Iwanaga ............................ 280/728.3 |

* cited by examiner

Primary Examiner—Kenneth R. Rice
Assistant Examiner—Lynda Jasmin
(74) Attorney, Agent, or Firm—Tarolli, Sundheim, Covel, Tummino & Szabo L.L.P.

(57) ABSTRACT

An apparatus (10) comprises a canister (30) and an inflatable device (80) having a deflated condition and an inflated condition for helping to protect a vehicle occupant. The inflatable device (80) has a first portion (82) fixed in the apparatus (10) and also has a second portion (86). The apparatus (10) includes an inflation fluid source (96) for providing inflation fluid to inflate the inflatable device (80). A cover (50) for covering at least a portion of the canister (30) has a first portion (54) and a second portion (52). The first portion (54) of the cover (50) moves upon inflation of the inflatable device (80) to provide an opening (60) through which the second portion (86) of the inflatable device is deployed. The first portion (82) of the inflatable device (80) engages and is fixed to the second portion (52) of the cover (50) by structure (100) free of a retaining ring inside the canister (30) when the inflatable device is deflated and when the inflatable device is inflated.

7 Claims, 3 Drawing Sheets

AIR BAG MODULE

BACKGROUND OF THE INVENTION

1. Technical Field

The present invention relates to a vehicle safety apparatus including an inflatable vehicle occupant protection device that is mounted in a portion of a vehicle such as a vehicle instrument panel.

2. Description of the Prior Art

It is known to inflate an inflatable vehicle occupant protection device, such as an air bag, to help protect a vehicle occupant. The air bag is mounted in a portion of the vehicle such as the vehicle instrument panel or steering wheel. The air bag is typically made from a fabric material, such as woven nylon, and has a mouth portion and a body portion. The mouth portion of the air bag is secured to the vehicle portion by a retaining ring or other fasteners. When the air bag is inflated, the mouth portion of the air bag remains secured in position on the vehicle portion by the retaining ring, and the body portion of the air bag inflates through a deployment opening into a position to help protect the vehicle occupant.

SUMMARY OF THE INVENTION

The present invention is an apparatus comprising a canister and an inflatable vehicle occupant protection device having a deflated condition and an inflated condition for helping to protect a vehicle occupant. The inflatable device has a first portion fixed in the apparatus and also has a second portion. The apparatus includes an inflation fluid source for providing inflation fluid to inflate the inflatable device. A cover for covering at least a portion of the canister has a first portion and a second portion. The first portion of the cover moves upon inflation of the inflatable device to provide an opening through which the second portion of the inflatable device is deployed. The first portion of the inflatable device engages and is fixed to the second portion of the cover by structure free of a retaining ring inside the canister when the inflatable device is deflated and when the inflatable device is inflated.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF AN EMBODIMENT OF THE INVENTION

Figure 1:
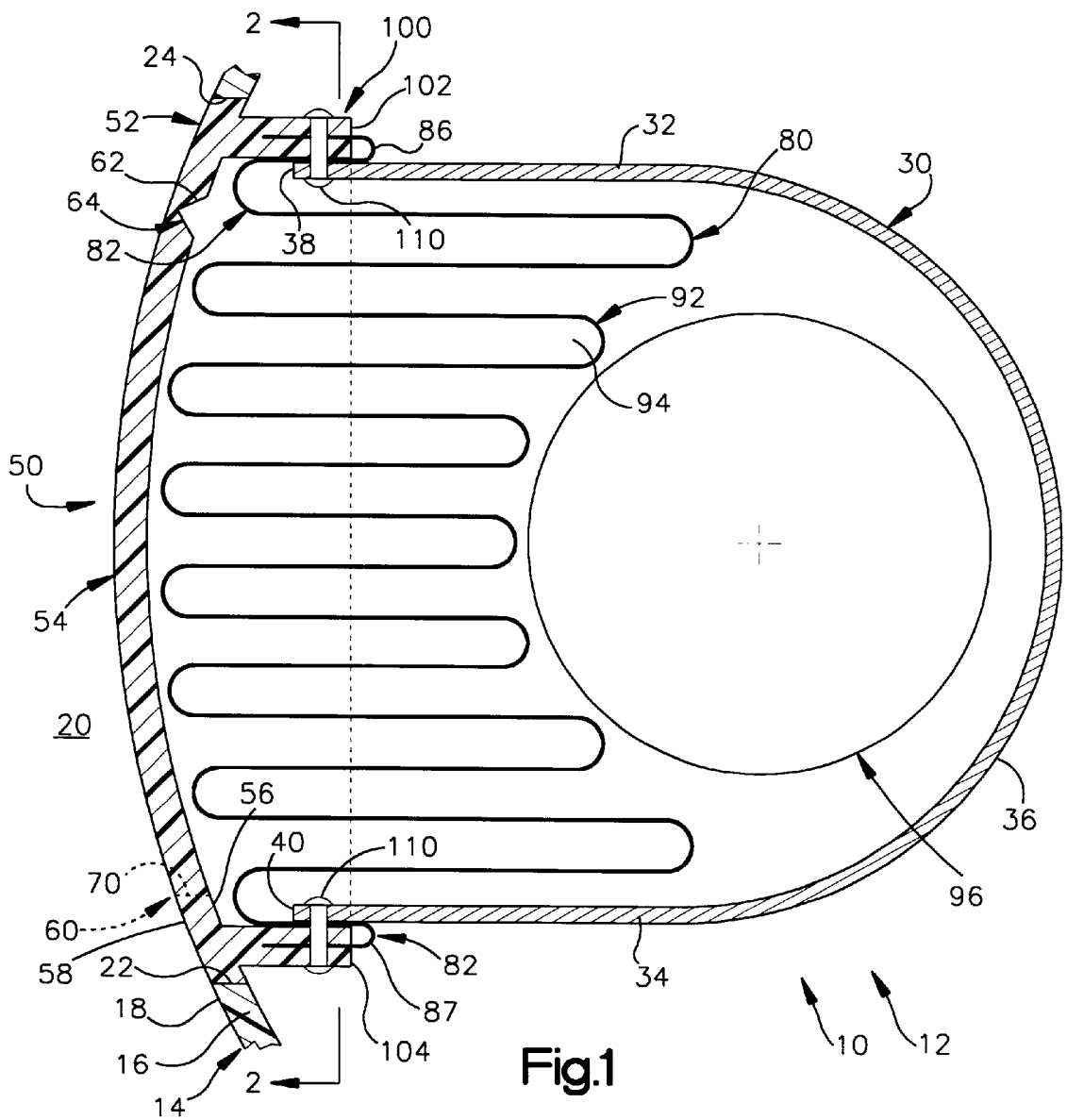
FIG. 1 is a schematic sectional illustration of an air bag module constructed in accordance with the present invention.
Figure 2:
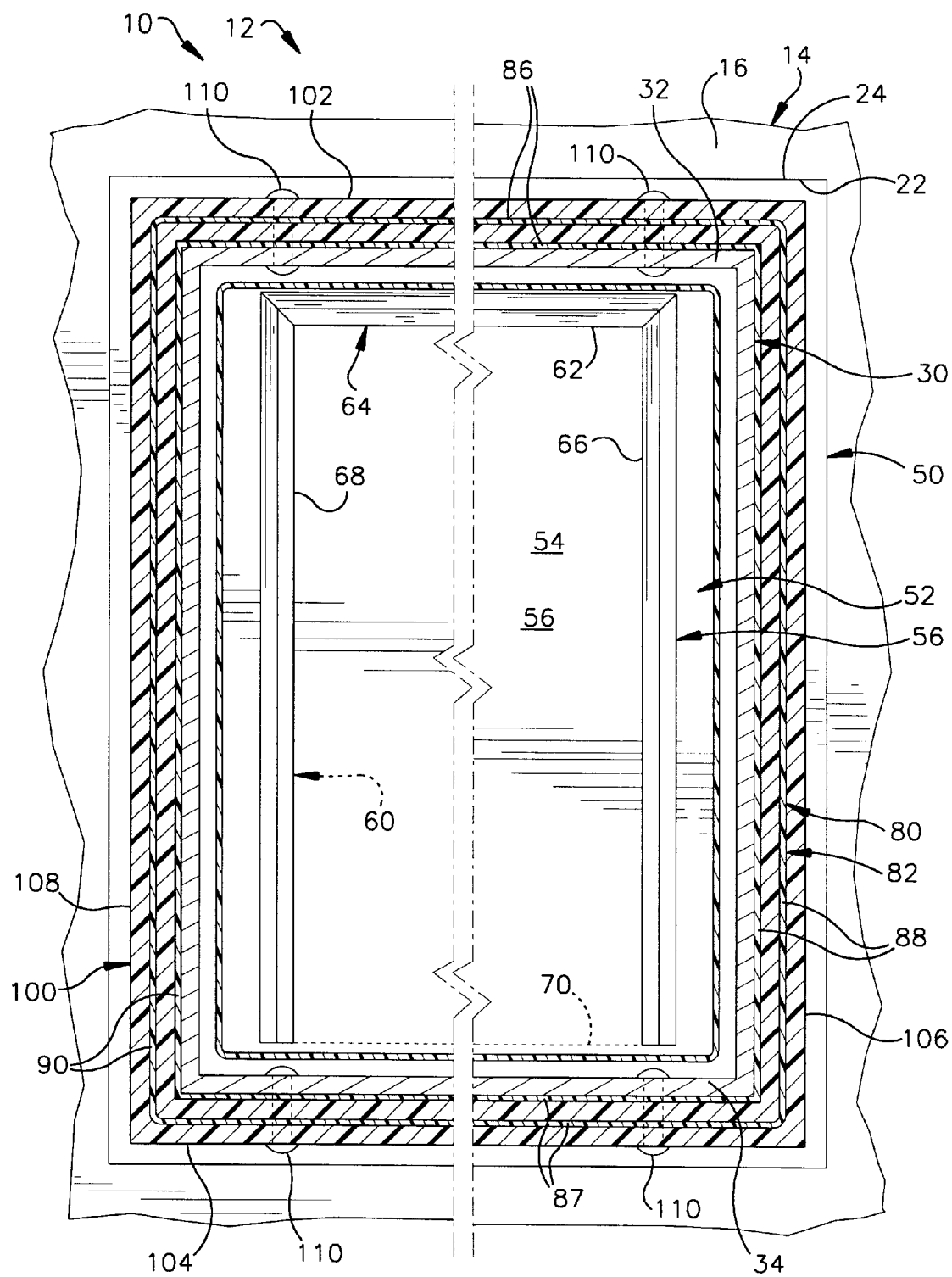
FIG. 2 is a sectional view of the air bag module of FIG. 1, taken along line 2—2 of FIG. 1.

The present invention relates to a vehicle safety apparatus including an inflatable vehicle occupant protection device that is mounted in a portion of a vehicle such as a vehicle instrument panel. As representative of the present invention, FIG. 1 illustrates schematically an air bag module 10 constructed in accordance with the present invention. The air bag module 10 is mounted in a portion of a vehicle 12 that includes an instrument panel 14. The instrument panel 14 includes a trim panel 16 that has an outer side surface 18 exposed to the vehicle occupant compartment 20. The trim panel 16 has an edge surface 22 that defines an opening 24 in the trim panel.

The air bag module 10 is secured to the instrument panel 14 in a known manner, not shown, so that the module fits into the opening 24 in the trim panel 16. The air bag module 10 includes a canister or container 30 that is preferably made from metal. The canister 30 has parallel upper and lower walls 32 and 34 joined by a curved central wall 36. The upper and lower walls 32 and 34 have outer edge portions 38 and 40, respectively, disposed adjacent the opening 24 in the trim panel 16.

The air bag module 10 also includes a cover 50 that is preferably injection molded. The cover 50 is preferably made from the same plastic material as the portion of the trim panel 16 that extends around the opening in the trim panel. The cover 50 of the air bag module 10 includes a door frame 52 and a door 54. The door frame 52 is preferably molded as one piece with the door 54 as described below. The door frame 52 has inner and outer major side surfaces 56 and 58.

The door frame 52 defines a deployment opening 60 in the cover 50 of the air bag module 10. The upper edge of the deployment opening 60 is defined by an upper portion 62 of an upside-down U-shaped tear seam 64 between the door frame 52 and the door 54. The inboard and outboard side edges of the deployment opening 60 are defined by inboard and outboard side portions 66 and 68 of the tear seam 64. The lower edge of the deployment opening 60 is defined by a predetermined weakened portion 70 of the cover 50 that forms a hinge between the door frame 52 and the door 50. The deployment opening 60 thus extends completely around the door.

The air bag module 10 also includes an inflatable vehicle occupant protection device in the form of an air bag 80. The air bag 80 is a known device which, when inflated, can help to protect an occupant of the vehicle.

The air bag 80 has a first portion or mouth portion 82. The mouth portion 82 of the air bag 80 defines an inflation fluid opening 84 in the air bag. The mouth portion 82 of the air bag 80 has a rectangular configuration generally similar to, but slightly larger than, the deployment opening 60. Specifically, the mouth portion 82 of the air bag 80 includes an upper part 86 that extends parallel to the upper edge 62 of the deployment opening 60, and a lower part 87 that extends parallel to the lower edge 70 of the deployment opening. The mouth portion 82 of the air bag 80 also includes inboard and outboard side parts 88 and 90 that extend parallel to the inboard and outboard side edges 66 and 68 of the deployment opening 60.

The air bag 80 also has a second portion or body portion 92. The body portion 92 of the air bag 80 extends from the mouth portion 82 and defines an inflation fluid volume 94 in the air bag. The inflation fluid opening 84 in the mouth portion 82 of the air bag 80 opens into the inflation fluid volume 94 in the body portion 92 of the air bag.

The air bag module 10 includes a bag mounting flange 100 for securing the air bag 80 to the cover 50. The bag mounting flange 100 preferably is made from the same material as the cover 50 and is preferably molded as one piece with the cover including the door frame 52. The bag mounting flange 100 projects from the inner major side surface 56 of the door frame 52 in a direction away from the passenger compartment 20 of the vehicle 12. The bag mounting flange 100 extends completely around the deployment opening 60 in the door frame.

The bag mounting flange 100 has a rectangular configuration generally similar to the configuration of the mouth portion 82 of the air bag 80. Specifically, the bag mounting flange includes an upper part 102 that extends parallel to the upper edge 62 of the deployment opening 60, and a lower part 104 that extends parallel to the lower edge 70 of the deployment opening. The bag mounting flange 100 also includes inboard and outboard side parts 106 and 108 that extend parallel to the inboard and outboard side edges 66 and 68 of the deployment opening 60.

The mouth portion 82 of the air bag 80 is embedded in the bag mounting flange 100. Specifically, the upper part 86 of the mouth portion 82 of the air bag 80 is embedded in the upper part 102 of the bag mounting flange 100. The lower part 87 of the mouth portion 82 of the air bag 80 is embedded in the lower part 104 of the bag mounting flange 100. The inboard and outboard side parts 88 and 90 of the mouth portion 92 of the air bag 80 are embedded in the inboard and outboard side parts 106 and 108, respectively, of the bag mounting flange 100.

The mouth portion 82 of the air bag 80 is preferably insert molded with the bag mounting flange 100 and thus with the door frame 52. When so molded, the mouth portion 82 of the air bag 80 engages the material of the bag mounting flange 100 of the cover 50. The mouth portion 82 of the air bag 80 is fixed to the air bag module 10 by the bag mounting flange 100. A plurality of rivets 110 interconnect the bag mounting flange 100 and the canister walls 32 and 34. The rivets 110 help to hold the air bag 80 to the mounting flange 100, but the embedding of the mouth portion 82 of the air bag in the material of the mounting flange is sufficient to secure the air bag to the cover 50. No retaining ring is needed inside the canister 30.

The air bag module 10 also includes an inflator 96. The inflator 96 is secured to the canister 30 in a manner not shown and is electrically actuatable to provide inflation fluid for inflating the air bag 80. The inflator 96 is operatively connected to vehicle electric circuitry (not shown) for sensing a deployment crash condition and for actuating the inflator in response.

Figure 3:
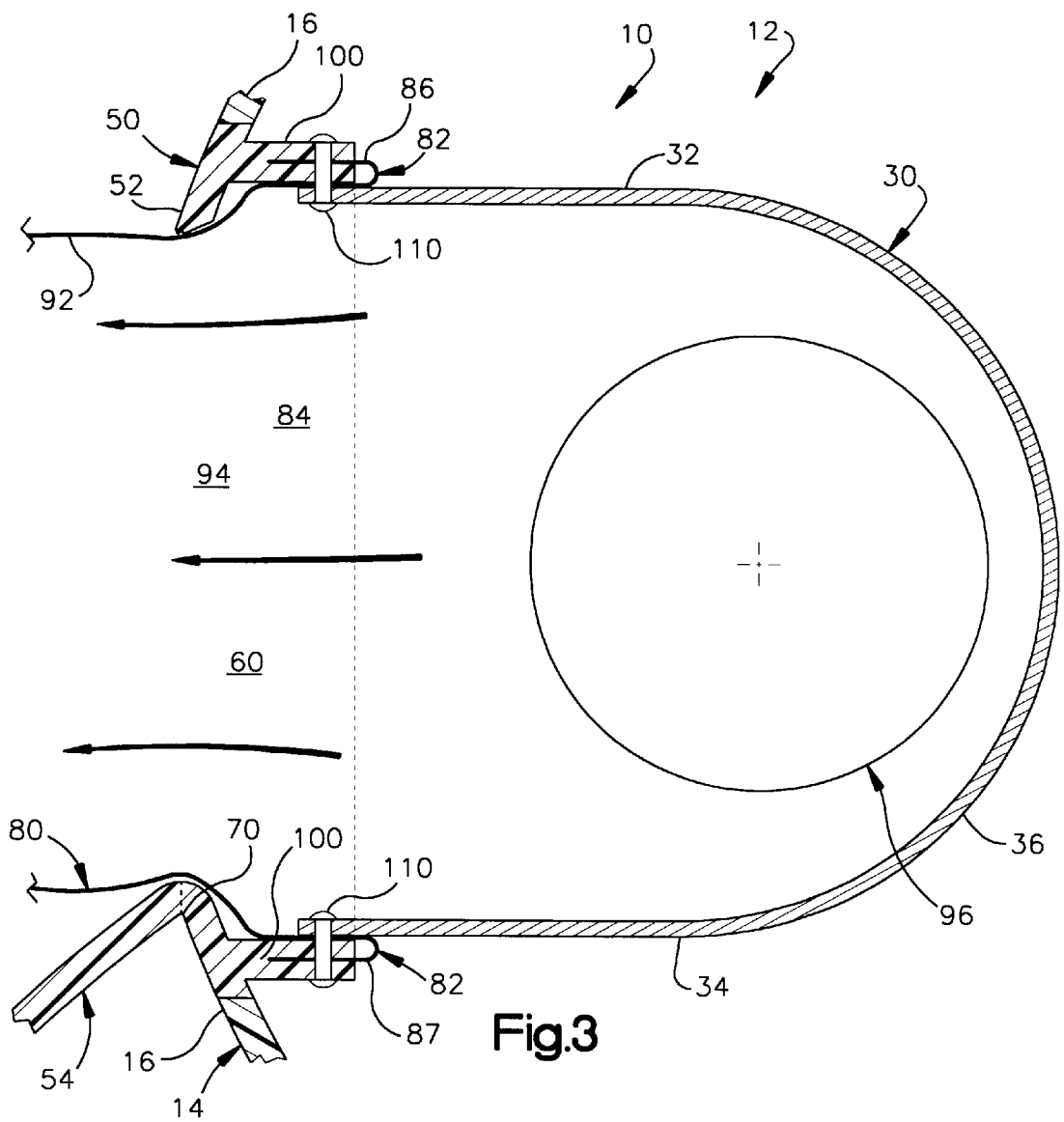
FIG. 3 is a view similar to FIG. 1 showing the air bag module after actuation.

In the event of a deployment crash condition involving sudden vehicle deceleration, or other event for which protection of the vehicle occupant may be desired, the inflator 96 is actuated and directs inflation fluid under pressure into the air bag 80. The inflating air bag 80 expands outwardly against the door 54 of the air bag module 10. The cover 50 of the air bag module 10 ruptures at the tear seam 64, and the door 54 pivots outwardly about the hinge 70 to uncover the deployment opening 60 in the cover. The body portion 92 of the air bag 80 inflates out of the canister 30 through the deployment opening 60 into the vehicle occupant compartment 20, as shown schematically in FIG. 3. The mouth portion 82 of the air bag 80 remains fixed to the bag mounting flange 100 of the cover 50 of the module 10.

From the above description of the invention, those skilled in the art will perceive improvements, changes and modifications in the invention. For example, the present invention is not limited to an air bag module which is mounted on a vehicle instrument panel, and can be used with an air bag module mounted on a vehicle steering wheel or other portion of the vehicle. Such improvements, changes and modifications within the skill of the art are intended to be covered by the appended claims.

Having described the invention, we claim:

1. An apparatus comprising:
   an inflatable vehicle occupant protection device having a deflated condition and an inflated condition for helping to protect a vehicle occupant, said inflatable device having a mouth portion fixed in said apparatus and having a body portion;
   an inflator for providing inflation fluid to inflate said inflatable device;
   a cover for covering at least a portion of said apparatus, said cover having a door frame and a door movable relative to said door frame;
   said door frame of said cover moving upon inflation of said inflatable device to provide a deployment opening through which said body portion of said inflatable device is deployed;
   said mouth portion of said inflatable device being embedded in said door frame of said cover.

2. An apparatus as set forth in claim 1 wherein said mouth portion of said inflatable device is molded in said door frame of said cover.

3. An apparatus comprising:
   a canister;
   an inflatable vehicle occupant protection device having a deflated condition and an inflated condition for helping to protect a vehicle occupant, said inflatable device having a first portion fixed in said apparatus and having a second portion;
   an inflation fluid source for providing inflation fluid to inflate said inflatable device;
   a cover for covering at least a portion of said canister, said cover having a first portion and a second portion;
   said first portion of said cover moving upon inflation of said inflatable device to provide a deployment opening through which said second portion of said inflatable device is deployed;
   said first portion of said inflatable device engaging and being fixed to said second portion of said cover by structure free of a retaining ring inside said canister when said inflatable device is deflated and when said inflatable device is inflated;
   said first portion of said inflatable device is embedded in said second portion of said cover.

4. An apparatus as set forth in claim 3 wherein said first portion of said inflatable device is molded in said second portion of said cover.

5. An apparatus as set forth in claim 3 wherein said first portion of said inflatable device that is fixed to said second portion of said cover comprises a mouth portion of said inflatable device that extends around said deployment opening.

6. An apparatus as set forth in claim 3 wherein said second portion of said cover is a door frame and said first portion of said cover is a door.

7. An apparatus comprising:
   a vehicle instrument panel having a movable door covering a deployment opening in said instrument panel, said instrument panel also having plastic panel portions extending perpendicular to said covering and defining said opening;
   an inflatable vehicle occupant protection device having a deflated condition and an inflated condition for helping to protect a vehicle occupant; and
   an inflation fluid source for providing inflation fluid to inflate said inflatable device through said deployment opening;
   said inflatable device having a portion embedded in said plastic panel portions to retain said inflatable device to said instrument panel;
   said portion of said inflatable device being molded in said plastic panel portions.

* * * * *